April 17, 1962

F. LÜCK 3,029,793

ROTARY PISTON ENGINE WITH ROTARY PISTONS ARRANGED ONE WITHIN THE OTHER

Filed Jan. 30, 1961

Inventor:
Friedrich Lück
By
Patent Agent.

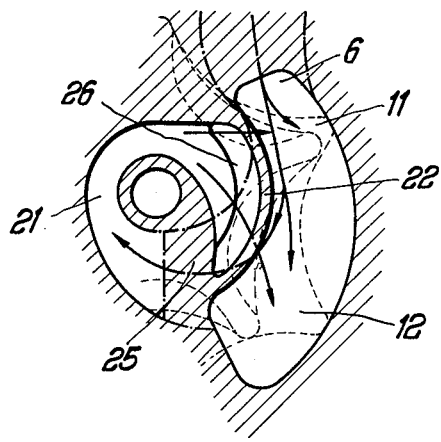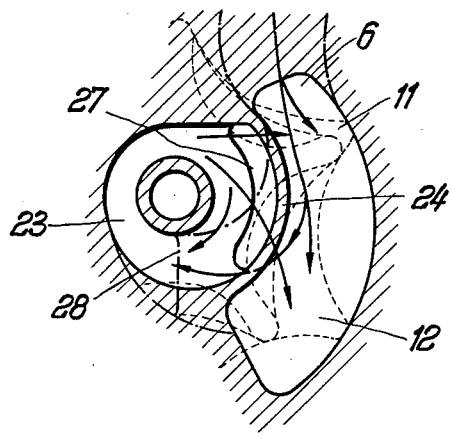

United States Patent Office 3,029,793
Patented Apr. 17, 1962

3,029,793
ROTARY PISTON ENGINE WITH ROTARY PISTONS ARRANGED ONE WITHIN THE OTHER
Friedrich Lück, Berlin-Tegel, Germany, assignor to Borsig Aktiengesellschaft, Berlin-Tegel, and Wankel G.m.b.H., Lindau (Bodensee), Germany
Filed Jan. 30, 1961, Ser. No. 85,788
Claims priority, application Germany Feb. 5, 1960
6 Claims. (Cl. 121—70)

The present invention relates to a rotary piston engine with rotary pistons arranged one within the other and provided with teeth. The present invention is particularly directed to a rotary piston engine of the above mentioned type in which the rotary pistons are eccentrically arranged one within the other, while the working medium is entirely or at least to its major extent fed into and in most instances also discharged from said engine through a lid at one end face of the engine.

Rotary piston engines of this type as heretofore known have numerous advantages but also have the drawback that their working chambers are limited as to their axial length because the inlet and outlet cross sections at the end faces do not increase with the length of the engine. Every step which results in an improvement of the fluid flow conditions in the inlet or outlet at certain given cross sections, also increases the economy of the engine either by improving the degree of efficiency or by increasing the delivery.

The present invention is primarily concerned with the improvement in the inlet conditions and, more specifically, where the inlet connection enters the working chambers or cylinder chambers. Here the working medium enters the working chambers at considerable speed and has to flow around the edges at the end faces of the rotary piston body. The magnitude of the losses in energy occurring in this connection is greatly dependent on the design of these edges and on the direction in which they are hit by the flow of the working medium.

Inasmuch as the edges of the concave surfaces of delimitation between the teeth of the inner rotary piston have no special function, they may without difficulties be rounded off. However, this is not admissible or only to a rather limited extent with the edges of the outer rotary piston because otherwise the seal between the individual working chambers would be harmfully affected.

It is, therefore, an object of the present invention to move the supply of the working medium to a rotary piston engine of the above character away from the edges of the outer rotary piston and to effect at a flow deviation as low as possible the supply of the working medium which unavoidably has to remain at the edges of said outer rotary piston.

It is also an object of the present invention to provide an arrangement as set forth in the preceding paragraph, which will yield an improved filling of the working chambers.

It is a still further object of this invention to provide a rotary piston engine of the type set forth in the preceding paragraphs, which will assure a more uniform flow of the working medium into the working chambers while reducing the development of noise.

These and other objects and advantages of the invention will appear more clearly from the following specification in connection with the accompanying drawings, in which:

FIGS. 3 and 4 illustrate portions of the same cross section as FIG. 2 but with a somewhat modified annular passage.

General Arrangement

The present invention is characterized primarily in that the inlet connection which is inclined as far as possible with regard to the end face has connected thereto a helical annular passage which leads into the cylinder chambers within the range of the inner rotary piston. Due to the good rounding off of the edges of the inner rotary piston, the inflow of the working medium from said passage into the working chambers is hardly at all or only very slightly affected. Simultaneously, the incoming working medium is subjected to the centrifugal force of the inner rotary piston as a result of which an improved filling of the working chambers will be obtained. Inasmuch as the helical annular chamber is connected to the inlet connection in the neighborhood of the edge controlling the end of the inlet, i.e. where the working chambers due to their change in volume have almost reached their largest volume and, therefore, can receive only a very small additional quantity of working medium, the said helical annular passage also brings about a more uniform inflow and thus a reduced noise development due to the fact that the temporary accumulation or damming up at the respective point will be considerably reduced.

The inflow and also the outflow conditions of the engine may be further improved by designing the wall surfaces between the teeth and the inner rotary piston so that in axial direction they will resemble a parabola. The fluid flow velocity within the cylinder chambers will thus take a more uniform course thereby reducing the pressure losses.

Structural Arrangement

Figure 1:
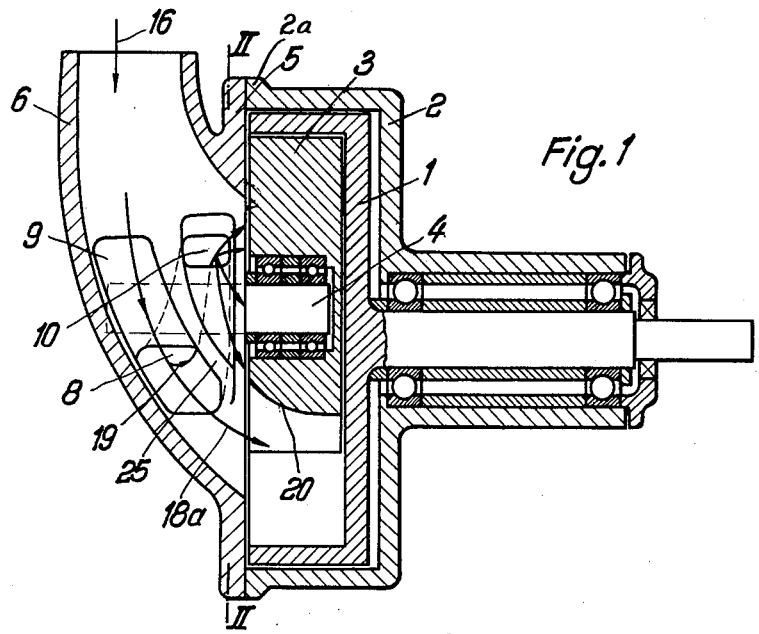
FIG. 1 illustrates a longitudinal section through a rotary piston compressor according to the present invention, the section through the lid passing through the suction connection, and the tooth ratio of the rotary pistons being 6:5.
Figure 2:
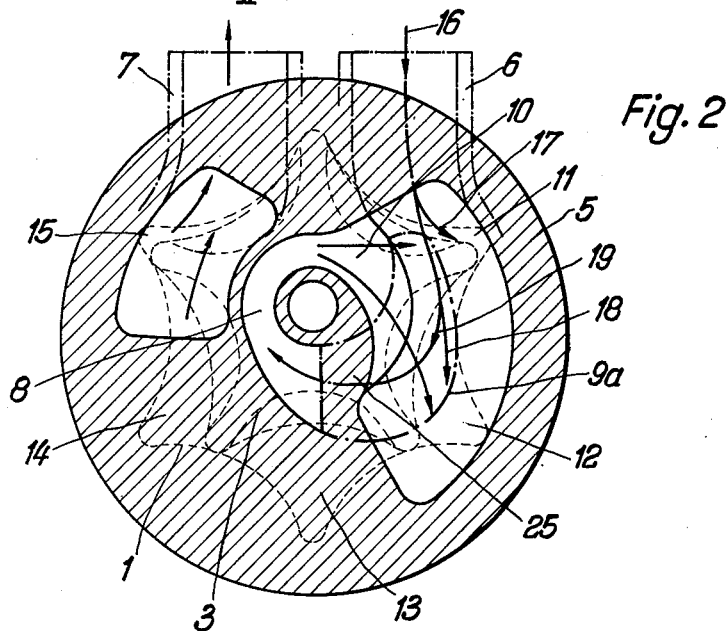
FIG. 2 illustrates a cross section through the housing lid and represents a section taken along the line II—II of FIG. 1.

Referring now to the drawings in detail, and FIGS. 1 and 2 thereof in particular, the arrangement shown therein comprises an outer rotary piston 1 which is journalled in overhung position in housing 2, while the inner rotary piston 3 is journalled in the housing lid 5 by means of a pivot 4. The said lid 5 carries the inlet connection 6 which is inclined with regard to its end face 2a. The said lid 5 also carries the outlet connection 7 which advantageously is likewise inclined to the end face of the engine. The inner portion of inlet connection 6 is followed by a passage 8 with its inlet opening 9. This passage 8 leads in a helical manner around the axis of the inner rotary piston 3 and has its outlet opening 10 directed to the working chambers, the opening 10 being separated from the opening 9 by the wall portion 25 shown in section in FIGS. 2 and 3. The working chambers 11, 12, 13, 14 and 15 are confined by the rotary pistons 1 and 3 illustrated in FIGS. 2 to 4 by dash lines. When the rotary pistons rotate in the same direction about their axes, these chambers increase and decrease in size. The extension of the passage inlet opening 9 at the inlet connection 6 is indicated in FIG. 2 by a dot-dash line 9a. In FIGS. 3 and 4, this line has been omitted for better clarity. The circumferential lines above the drawing plane of the inlet and outlet connections and of the annular passages are illustrated in FIGS. 2, 3 and 4 by dot-dash lines.

The direction of flow is indicated by arrows. Arrow 16 designates the point of entrance of the working medium into the suction connection 6, whereas the arrows 17, 18 and 18a indicate the direct passage of the working medium into the working chambers 11, 12 and 13. Arrow 19 indicates the flow following at the rear portion of the inner portion of the inlet connection 6. This flow follows the passage 8 (only partially shown in section)

which passes in a helical manner around the axis of the inner rotary piston 3 and leaves the passage through opening 10 in order to flow into the upper end of the suction connection where it passes into the working chambers 11 and 12. The longitudinal section of the inner rotary piston 3 as shown in FIG. 1 clearly shows the parabolic shape of the wall surfaces 20 located between the teeth and pertaining to the inner rotary piston.

FIG. 3 shows a modified shape of the annular passage. Passage 21 differs from that of FIG. 2 merely in that its mouth 26 is separated from the inlet connection 6 by a wall 22. The working fluid passing through said passage can thus not return into the inlet connection 6 but passes directly into chambers 11 and 12. A mutual harmful effect of the quantities of gas leaving the inlet connection and the annular passage will thus be impossible.

A further modification of the helical annular chamber is illustrated in FIG. 4. While the mouth 27 of passage 23 is separated by a partition 24 from the inlet connection 6, it should be noted that the last winding of the passage forms a ring closed in itself. The rear end of the partition is clearly indicated by the dot-dash line 28, said partition separating the inlet opening of the helically shaped front section of the passage from the annular section. The working medium passing through opening 9 into the passage flows to the greater extent into the chambers 11, 12 while a rest or remainder will be passed around again and again in the annular chamber. Such an arrangement furthermore quiets the flow which can never be 100% shock-free.

It is, of course, to be understood that the present invention is, by no means, limited to the particular constructions shown in the drawings but also comprises any modifications within the scope of the appended claims.

What I claim is:

1. In a rotary piston machine: a housing open at one end, an outer rotary piston provided with inner teeth and rotatably mounted within said housing, an inner rotary piston eccentrically arranged with regard to and rotatable within and relative to said outer rotatable piston, said inner rotary piston being equipped with outer teeth slidably engaging said inner teeth of said outer rotary piston and confining with said inner teeth working chamber means, and lid means connected to said open end of said housing and provided with an inlet and an outlet connection for communication with said chamber means, said inlet connection having a portion thereof facing the axis of rotation of said inner rotary piston and being provided with a helical passage extending nearly coaxially around the adjacent portion of the axis of rotation of said inner rotary piston and having an exit opening directed toward that portion of said chamber means which is within the range of said inner rotary piston, whereby a portion of the working medium from the inlet connection will pass through said passage to working chamber means within the range of the inner rotary piston.

2. A rotary piston machine according to claim 1, in which said passage having its mouth directed toward that portion of said chamber means which is within the range of said inner rotary piston leads back into said inlet connection.

3. A rotary piston machine according to claim 1, in which those surfaces of the inner teeth which confine said chamber means with said outer teeth have a concave contour in cross section and a substantially parabolic contour in longitudinal section.

4. In a rotary piston machine: a housing open at one end, an outer rotary piston provided with inner teeth and rotatably mounted within said housing, an inner rotary piston eccentrically arranged with regard to and rotatable within and relative to said outer rotatable piston, said inner rotary piston being equipped with outer teeth slidably engaging said inner teeth of said outer rotary piston and confining with said inner teeth working chamber means, and lid means connected to said open end of said housing and provided with a inlet and an outlet connection for communication with said chamber means, the axis of said inlet connection forming an acute angle with the lid surface to be connected to said housing and leading substantially tangentially into said chamber means with regard to the direction of rotation of said rotary pistons, said inlet connection having a portion thereof facing the axis of rotation of said inner rotary piston and being provided with a helical passage extending nearly coaxially around the adjacent portion of the axis of rotation of said inner rotary piston and having an exit opening directed toward that portion of said chamber means which is within the range of said inner rotary piston, whereby a portion of the working medium from the inlet connection will pass through said passage to working chamber means within the range of the inner rotary piston.

5. In a rotary piston machine: a housing open at one end, an outer rotary piston provided with inner teeth and rotatably mounted within said housing, an inner rotary piston eccentrically arranged with regard to and rotatable within and relative to said outer rotatable piston, said inner rotary piston being equipped with outer teeth slidably engaging said inner teeth of said outer rotary piston and confining with said inner teeth working chamber means, and lid means connected to said open end of said housing and provided with an inlet and an outlet connection for communication with said chamber means, said inlet connection having a portion thereof facing the axis of rotation of said inner rotary piston and being provided with a helical passage extending nearly coaxially around the adjacent portion of the axis of rotation of said inner rotary piston and having an exit opening directed toward that portion of said chamber means which is within the range of said inner rotary piston, whereby a portion of the working medium from the inlet connection will pass through said passage to working chamber means within the range of the inner rotary piston, the mouth of said passage being separated from said inlet connection by a wall.

6. A rotary piston machine according to claim 5, in which said passage forms a closed ring so that a portion of the working medium being passed from said inlet connection into said passage will circulate in said passage.

No references cited.